United States Patent [19]

Schobinger et al.

[11] 3,719,617

[45] March 6, 1973

[54] TEXTILE SIZING COMPOSITION CONTAINING HIGHLY WATER SOLUBLE DEXTRIN PHOSPHATE

[75] Inventors: Ulrich Schobinger, Zug; Cla Christoffel, Waedenswil; Kurt Berner, Pfaeffikon-SZ, all of Switzerland

[73] Assignee: Blattmann & Co., Waedenswil, Switzerland

[22] Filed: June 3, 1971

[21] Appl. No.: 149,823

Related U.S. Application Data

[62] Division of Ser. No. 826,707, May 21, 1969, Pat. No. 3,642,774.

[30] Foreign Application Priority Data

May 21, 1968 Switzerland..........................7533/68

[52] U.S. Cl. .....260/17.4 ST, 106/210, 117/139.5 C, 117/139.5 CQ
[51] Int. Cl. ...........................C08b 25/02, C09j 3/06
[58] Field of Search................260/17.4 ST; 106/210; 117/139.5

[56] References Cited

UNITED STATES PATENTS 3,637,407  1/1972  Schobinger et al...................106/213

3,642,774  2/1972  Schobinger et al. ...........260/17.4 ST

FOREIGN PATENTS OR APPLICATIONS 1,443,509  1/1969  Germany......................260/17.4 ST Primary Examiner—William H. Short
Assistant Examiner—Edward Woodberry
Attorney—Albert C. Johnston et al.

[57] ABSTRACT

Compositions for sizing textiles are provided which contain a major proportion of a low molecular, highly water soluble dextrin phosphate and a minor proportion of a high molecular nitrogen containing starch phosphate or a polymer selected from water soluble polyvinyl acetates, polyvinyl alcohols and polyacrylates, or of a mixture of such polymer and a high molecular nitrogen containing starch phosphate. The high molecular starch phosphate typically has a viscosity of about 40,000 to 60,000 cps when in 5 percent solution in water at 25° C. The low molecular dextrin phosphate is a thermally degraded phosphorylated starch having between 0.3 and 3 percent by weight of phosphorus molecularly bound therein and having a light color, a solubility higher than 30 percent in water at 25° C. and a viscosity in the range of about 5 to 500 cps when in 5 percent solution in water at 25° C.

7 Claims, No Drawings

TEXTILE SIZING COMPOSITION CONTAINING HIGHLY WATER SOLUBLE DEXTRIN PHOSPHATE

This is a division of copending application Ser. No. 826,707, filed May 21, 1969, now U.S. PAT. No. 3,642,774.

This invention relates to textile sizing compositions making use of new phosphorus containing starch products. These products are thermally degraded phosphated starches characterized by high cold water solubility and a low viscosity in solution and may therefore be classified as phosphorylated dextrins, or simply as dextrin phosphates.

According to the invention, relatively low molecular dextrin phosphates are utilized which contain between 0.3 and 3 percent by weight of molecularly bound phosphorus and have cold (25° C.) water solubilities that range from well above 30 percent up to complete (100 percent) solubility, with solubilities of 75 to 100 percent in water at 65° C. The products when in 5 percent solution in water at 25° C. have viscosities in the range of about 5 to 500 cps. They are white powders remarkably free of discoloration. Solutions of them show little tendency to set back, or retrograde, so that they have longer pot life than do solutions of conventional dextrins or soluble starches. Moreover, dry films formed from the solutions are quite elastic and not sticky, yet are also highly reversible in that they may be dissolved easily in water.

Accordingly, the new dextrin phosphates are especially suitable for the sizing and finishing of textile fibers, yarns and fabrics.

The procedure most effective for the production of the new dextrin phosphates is generally as follows:

A solution of alkali metal phosphate and phosphoric acid is prepared and added to finely divided starch, for example, by spraying it onto the granules, so as to add an amount of the phosphorus compounds corresponding to between 1 and 7 and preferably about 2 to 4 parts by weight of phosphorus contained in them per 100 parts of starch, of which phosphorus 25 to 70 percent is supplied in the phosphoric acid. The amount of added water is generally between 10 and 40 parts of water per 100 parts of starch.

The resulting moist acidic mixture of starch granules and phosphorus compounds is heated to 80° to 90° C. under a low vacuum, generally one of about 500 to 600 mm. Hg, for a period of 2 to 4 hours. This heating and the attendant dehydration of the mixture intimately concentrate and react the phosphorus compounds with the starch while moisture is still present in the granules. Then the reaction mixture is heated up to a higher temperature between 125° and 140° C. under a high vacuum of about 50 to 90 mm. Hg to complete the dehydration and is held in this temperature range under the vacuum for 1 to 3 hours for completion of the phosphorylation and degradation of the starch, whereupon the resulting dextrin phosphate is cooled under a continuing high vacuum such as one of about 50 to 70 mm. Hg.

The dextrin phosphate so produced is taken directly from the reaction vessel, or vacuum cooker, in a finely divided, white condition suitable for industrial uses. Because of the limited amount of added phosphate and of the extremely light color, no washing or purifying treatment or further processing of the product is required. Accordingly, it is comparatively economical to produce.

The phorphorus compounds suitable for the reaction include any of the alkali metal orthophosphates, hypophosphates, metaphosphates, pyrophosphates and polyphosphates, including polymetaphosphates, in admixture with any of the ortho-, hypo-, pryo- and metaphosphoric acids.

The starch to be converted may be any of many types of naturally occurring starches, such, for example, as corn starch, potato starch, wheat starch, waxy maize, tapioca starch, milo starch, rice starch, or others.

According to another feature of the invention, it has been found that the new dextrin phosphates can be made with their stability further enhanced by carrying out the heating and reaction of the starch with the mixture of alkali metal phosphate and phosphoric acid in the presence of a small amount of a water soluble aldehyde. A normally solid aldehyde such as paraformaldehyde may be added in granular form to the starch, or an aldehyde such as formaldehyde, acetaldehyde, propionaldehyde or glyoxal may be added in liquid form to the reaction mixture. From 0.01 to 0.2 percent of the aldehyde is added, based on the weight of the starch.

In this way, a small amount of aldehyde is condensed in the phosphated starch products, and extremely stable cold water soluble dextrin phosphates are obtained. The gelatinization characteristics of these aldehyde-modified products are so suppressed that solutions of them have a suitably low and very stable viscosity even after being heated to an elevated temperature, such as 95° C., and cooled down to 25° C.

Among the valuable uses which have been found for the new dextrin phosphates are uses of them as a major constituent of new compositions for the sizing of textiles, as in the weaving of cellulosic fibers or yarns, such as cotton, or synthetic fibers, or yarns of mixed cellulosic and synthetic fibers.

For the sizing of cotton and other yarns of spun fibers, it is advantageous to mix a major proportion of the relatively low molecular dextrin phosphate with a minor proportion of a high molecular nitrogen containing starch phosphate, such as one having a viscosity of about 40,000 to 60,000 cps when in 5 percent solution in water at 25° C., as prepared according to the process of U.S. Pat. No. 3,352,848. For example, mixtures of 60 to 80 parts of the former with 20 to 40 parts of the latter are quite effectual.

These compositions form sizing solutions of extreme stability, which do not thicken objectionably upon prolonged standing. In the use of the solutions, the low molecular dextrin phosphate penetrates deeply into the yarn while the high molecular starch phosphate settles as a cover skin on outer surfaces of the yarn. Thus, a uniform sizing is obtained which protects the yarn most effectively against the mechanical and abrasive action of looms. Moreover, the new compositions enable the use of a lower yarn loading, or pick-up of size, for a given effect; faster loom speeds can be used; the sized textiles dry and wet divide easily; and the elasticity of the sized yarns is improved.

For the sizing of synthetic fibers or of blends of cellulosic and synthetic fibers, it is advantageous to mix the low molecular dextrin phosphate with a minor proportion of a synthetic polymer such as a water soluble polyvinyl acetate, polyvinyl alcohol or polyacrylate, or with both such a synthetic polymer and a high molecular, nitrogen containing starch phosphate such as mentioned above. The amount of the synthetic polymer needs be no more than between 5 and 30 percent of the dry weight of the whole sizing mixture.

In this way, highly compatible compositions are obtained which form very effective sizing solutions, with reduction of the need and expense for the relatively costly synthetic polymer. Due to the high reversibility (re-solubility) of films of the dextrin phosphate, these compositions also give sized textiles which can be desized more conveniently than those sized by a comparable mixture of the synthetic polymer with a conventional starch derivative such as thin-boiling starch or an oxypropylether of starch.

A composition advantageous for the sizing of fibers of acrylonitrile polymers, such as Orlon, or of blends of synthetic polyester fibers and cellulosic fibers, may be made, for example, by mixing the dextrin phosphate with a water soluble polyacrylate. Such blends can also be sized advantageously by compositions containing, by dry weight, about 50 to 70 percent of the dextrin phosphate with about 30 to 50 percent of a mixture of the polyacrylate and a high molecular nitrogen containing starch phosphate.

The invention is further illustrated by the following examples of preferred embodiments thereof.

A. Preparation of Dextrin Phosphates

EXAMPLE 1

To 100 kg. of commercial corn starch was added by spraying a solution made up from 20 l. of water, 10 kg. of tetrasodium pyrophosphate ($Na_4P_2O_7 \cdot 10\ H_2O$) and 6.2 kg. of 85 percent orthophosphoric acid, corresponding to 3 parts of phosphorus per 100 parts of starch, of which 54 percent was in the orthophosphoric acid. The pH of the solution was 3. The finely divided mixture of starch and phosphorus compounds, with stirring, was heated for 3 ½ hours under a vacuum of 560 mm. Hg. to 85° C. The mixture was then heated to 140° C. within 1 hour under a vacuum of 70 mm. Hg, practically all the water being thus removed, and held for 1 ½ hours at 140° C. under the same vacuum. The resulting dextrin phosphate was then cooled to room temperature under a vacuum of 50 to 70 mm. Hg.

This product dissolved rapidly in cold water, and showed a viscosity of 5 cps at 25° C. in 5 percent solution. Its solubility in water after 1 hour was 80 percent at 25° C. and 99 percent at 65° C. After washing with an 80 : 20 mixture of alcohol and water the product contained 1.10 percent of phosphorus considered to be molecularly bound.

EXAMPLE 2

To 200 kg. of commercial potato starch was added a solution made up from 60 l. of water, 20 kg of primary sodium orthophosphate ($NaH_2PO_4 \cdot 2\ H_2O$) and 6 kg. of 85 percent orthophosphoric acid, corresponding to 2.78 parts of phosphorus per 100 parts of starch, of which 29 percent was in the orthophosphoric acid. The pH of the solution was 3. The mixture was heated for 3 hours under a vacuum of 520 mm. Hg to 85° C. and then heated within 1 hour to 140° C. under a vacuum of 70 mm. Hg, whereby practically all the water was removed. The reaction mixture was held for 2 hours at 140° C. under a vacuum of 70 mm. Hg, after which the resulting dextrin phosphate was cooled under a vacuum of 50 mm. Hg to room temperature.

This product dissolved rapidly in cold water, showing a viscosity of 25 cps at 25° C. in 5 percent solution. Its solubility in water after 1 hour was 70 percent at 25° C. and 92 percent at 65° C. After washing with alcohol it contained 0.85 percent of molecularly bound phosphorus.

EXAMPLE 3

To 100 kg. of commercial tapioca starch was added a solution made up from 20 l. of water, 5 kg. of sodium tripolyphosphate ($Na_5P_3O_{10}$) and 2.3 kg. of 85 percent orthophosphoric acid, corresponding to 1.87 parts of phosphorus per 100 parts of starch, of which 33 percent was in the orthophosphoric acid. The pH of the solution was 4.5. The intimate mixture was heated for 3 hours to 90° C. under a vacuum of 550 mm. Hg, with stirring, then heated within 1 hour to 135° C. under a vacuum of 90 mm. Hg, whereby practically all the water was removed, and then held for 3 hours at 135° C. under a vacuum of 70 mm. Hg. The resulting dextrin phosphate was then cooled to room temperature under a vacuum of 50 to 70 mm. Hg.

This product showed a viscosity of 30 cps. at 25° C. in 5 percent solution. Its solubility in water after 1 hour was 60 percent at 25° C. and 90 percent at 65° C. After washing with alcohol it contained 0.80 percent of molecularly bound phosphorus.

EXAMPLE 4

To 200 kg. of commercial wheat starch was added a solution made up from 80 l. of water, 20 kg. of primary sodium orthophosphate ($NaH_2PO_4 \cdot 2\ H_2O$), 30 kg. of tetrasodium pyrophosphate ($Na_4P_2O_7 \cdot 10\ H_2O$) and 15 kg. of 85 percent orthophosphoric acid, corresponding to 6.08 parts of phosphorus per 100 parts of starch, 33 percent of the phosphorus being added as orthophosphoric acid. The pH of the solution was 3.5. The intimate mixture was heated for 3 hours to 85° C. under a vacuum of 560 mm. Hg, with stirring. Then it was heated up within 1 hour to 140° C. under a vacuum of 70 mm. Hg, whereby practically all the water was removed, and was held for 2 hours at 140° C. under a vacuum of 70 mm. Hg. The resulting dextrin phosphate was cooled under a vacuum of 50 to 70 mm. Hg to room temperature.

A 5 percent solution of this product, after being heated to 95° C. and cooled, showed a viscosity of 410 cps at 25° C. The solubility of this dextrin phosphate in water after 1 hour was 45 percent at 25° C. and 75 percent at 65° C. After washing with alcohol the product contained 2.9 percent of molecularly bound phosphorus.

EXAMPLE 5

To 100 kg. of commercial corn starch was added a solution made up from 20 l. of water, 10 kg. of tetrasodium pyrophosphate ($Na_4P_2O_7 \cdot 10\ H_2O$) and 12 kg. of 85 percent orthophosphoric acid, corresponding to 4.63 parts of phosphorus per 100 parts of starch, of which 70 percent is added as orthophosphoric acid. The pH of the solution was 2. The intimate mixture was heated for 4 ½ hours to 90° C. under a vacuum of 540 mm. Hg, with stirring. It was then heated up within one-half hour to 125° C. under a vacuum of 70 mm. Hg, whereby practically all the water was removed. The mixture was held for 1 hour at 125° C. and finally heated up to 140° C. within one-half hour under a vacuum of 70 mm. Hg. The resulting dextrin phosphate was then cooled to room temperature under a vacuum of 50 to 70 mm. Hg.

This product dissolved rapidly in cold water, showing a viscosity of 30 cps at 25° C. in a 28 percent solution. Its solubility in water at 25° C. was 100 percent. After washing with 80 percent alcohol it contained 1.5 percent of molecularly bound phosphorus.

EXAMPLE 6

To 100 kg. of commercial potato starch was admixed 50 g. of pulverulent paraformaldehyde (0.05 percent). Then a solution made up from 20 l. of water, 10 kg. of tetrasodium pyrophosphate ($Na_4P_2O_7 \cdot 10 H_2O$) and 2.5 kg. of 85 percent orthophosphoric acid was sprayed into the starch mixture. This corresponded to 2.07 parts of phosphorus per 100 parts of starch, of which 32 percent was in the orthophosphoric acid. The pH of the solution was 4.1. The intimate mixture was heated for 2 ½ hours to 90° C. under a vacuum of 580 mm. Hg, with stirring. It was then heated to 130° C. within 2 ½ hours under a vacuum of 80 mm. Hg and kept for one hour at 130° C. under a vacuum of 70 mm. Hg. The resulting product was cooled to room temperature under a vacuum of 50 to 70 mm. Hg.

The solubility of this product in water of 25° C. after 1 hour was 43.8 percent. An 8 percent solution of the product, after being heated to 95° C. and cooled down to 25° C., showed a viscosity of 1,000 cps. This solution increased in viscosity by less than 60 percent upon standing for 24 hours at 25° C., and by about 75 percent upon standing for 48 hours at 25° C. This dextrin phosphate after washing with 80 percent alcohol contained 0.70 percent of molecularly bound phosphorus.

EXAMPLE 7

To 100 kg. of commercial corn starch being stirred in a reaction vessel was added, by spraying onto the starch granules, a solution made up from 25 l. of water, 5.5 kg. of anhydrous tetrasodium pyrophosphate ($Na_4P_2O_7$), 5.9 kg. of 85 percent orthophosphoric acid and 0.2 kg. of a 30 percent solution of glyoxal. The added phosphorus compounds contained 2.86 parts of phosphorus per 100 parts of starch, of which 55 percent was in the orthophosphoric acid. The pH of the solution was 2.9. The intimate mixture was heated under a vacuum of 560 mm. Hg with stirring to 85° C. within 2 hours. Then it was heated up within 2 ½ hours to 128° C. under a vacuum of 80 mm. Hg and kept 1 ½ hours at 128° C. under a vacuum of 70 mm. Hg. The resulting product was cooled to room temperature under a vacuum of 50 mm. Hg.

An 8 percent solution of this dextrin phosphate, after being heated to 95° C. and cooled down to 25° C., showed a viscosity of 280 cps. After standing for 48 hours at 25° C. the solution showed a viscosity of 285 cps. The solubility of this dextrin phosphate in water after 1 hour was 48 percent at 25° C. and 89 percent at 65° C. After washing with an 80:20 mixture of alcohol and water the product contained 0.96 percent of molecularly bound phosphorus.

B. Use of the Dextrin Phosphate for Sizing Textiles

EXAMPLE 8

A mixture of 60 parts of low molecular dextrin phosphate prepared according to Example 6 and 40 parts of high molecular nitrogen containing starch phosphate having a viscosity of 40,000 to 60,000 cps in 5 percent solution in water (prepared according to U.S. Pat. No. 3,352,848) was dispersed in water so as to form two sizing solutions having dry substance concentrations of 15 and 11 percent, respectively.

These solutions were used for sizing cotton yarns of grades Ne 60/1 and Ne 20/1, respectively, in comparison with like use of conventional sizes which contained 14 and 10.5 percent, respectively, of acid-degraded starch. Results are shown in Table I below.

TABLE I

| Yarn | Size | Pick-up | Tours Abrasion Test | Tensile Strength |
|---|---|---|---|---|
| Cotton Ne 60/1 | Ex. 8, 15% Conc. | 19.1% | 111/111 | 240 g. |
| Cotton Ne 60/1 | Conventional, 14% Conc. | 24.1% | 102/107 | 228 g. |
| Cotton Ne 20/1 | Ex. 8, 11% conc. | 17.3% | 101/105 | 560 g. |
| Cotton Ne 20/1 | Conventional, 10.5% conc. | 21.1% | 94/89 | 550 g. |

The tests showed considerable improvements of sizing effects for the solutions making use of the present invention, along with savings of about 33 and 27 percent, respectively, in the amounts of size consumed.

EXAMPLE 9

The mixtures denoted in Table II below, in which the dextrin phosphate was one prepared according to Example 6, were formed into sizing solutions of 8 percent dry substance concentration and used in comparative tests for sizing and subsequently desizing yarn made of a 67:33 blend of polyester and cellulosic fibers, with the de-sizing (size removability) results shown in the table.

TABLE II

| Sizing Substance | Viscosity of 8% Solution | Size Removability* |
|---|---|---|
| Low molecular dextrin phosphate + polyacrylate, 75:25 | 1700 cps | 97.5% |
| Low molecular dextrin phosphate + high molecular starch phosphate as in Example 8 + polyacrylate, 50:25:25 | 2600 cps | 96.7% |
| Oxypropyl ether of starch + polyacrylate, 75:25 | 1400 cps | 92.5% |

*Weight percent of size removed by washing the sized yarn for 1 hour in water at 50° C.

EXAMPLE 10

A mixture of 80 parts of low molecular dextrin phosphate prepared according to Example 2 and 20 parts of a 50 percent solution of a polyacrylic acid ester (water soluble polyacrylate) was made into a solution containing 10 percent of dry substance. This solution was used for sizing poly-acrylonitril (Orlon) fibers, and compared as to effects with similarly used solutions of the same dry substance concentration made from substances as listed in Table III below, which table shows results of the comparative tests.

TABLE III

| Sizing Substance in 10% Solution | Abrasion pick-up | Tours Abrasion test | Elongation | Tensile Strength | Size Removability* |
|---|---|---|---|---|---|
| Dextrin phosphate + polyacrylate, 80:20 | 13.0% | 173/164 | 19.4% | 234 g. | 93% |
| Dextrin phosphate alone | 9.2% | 76/75 | 16.2% | 198 g. | 93% |
| Polyacrylate alone | 8.8% | 225/217 | 19.2% | 213 g. | 97% |
| Oxypropyl ether of starch + polyacrylate, 80:20 | 8.6% | 85/84 | 19.2% | 214 g. | 69% |
| Oxpropylether of starch alone | 8.6% | 67/63 | 18.0% | 186 g. | 92% |

* Weight percent of size removed by washing the sized Orlon fibers for 1 hour in water at 50° C.

EXAMPLE 11

A mixture of 60 parts of low molecular dextrin phosphate prepared according to Example 2, with 20 parts of the high molecular starch phosphate of Example 8 and 20 parts of an 87 percent hydrolyzed polyvinyl alcohol of medium molecular weight, was made into a solution containing 10 percent of dry substance. This solution was used for sizing synthetic polyester (Terylene) fibers, and compared as to effects with similarly used solutions of the same dry substance concentration made from substances as listed in Table IV below, which table shows results of the comparative tests.

TABLE IV

| Sizing Substance in 10% Solution | Abrasion pick-up | Tours Abrasion test | Elongation | Tensile Strength | Size Removability* |
|---|---|---|---|---|---|
| Dextrin phosphate + high molecular Starch phosphate + polyvinyl alcohol, 60:20:20 | 9.1% | 102/98 | 19.0% | 374 g. | 93% |
| Dextrin phosphate + high molecular starch phosphate, 75:25 | 6.8% | 59/60 | 19.2% | 390 g. | 92% |
| Polyvinyl alcohol alone | 6.9% | 101/99 | 19.8% | 377 g. | 93% |
| Oxypropyl ether of starch alone | 6.7% | 63/62 | 19.4% | 394 g. | 66% |
| Polyvinyl alcohol + oxypropyl ether of starch, 20:80 | 7.5% | 68/67 | 18.5% | 362 g. | 75% |
| Thin-boiling starch alone | 12.2% | 76/74 | 18.4% | 388 g. | 42% |
| Polyvinyl alcohol + thin boiling starch, 20:80 | 8.4% | 105/108 | 19.9% | 396 g. | 61% |

*Weight percent of size removed by washing the sized Terylene fibers for 1 hour in water at 50° C.

We claim:

1. A composition for sizing textiles, comprising by dry weight a major proportion of a low molecular, highly water soluble dextrin phosphate and a minor proportion of a high molecular nitrogen containing starch phosphate having a viscosity of about 40,000 to 60,000 cps when in 5 percent solution in water at 25° C., said dextrin phosphate consisting essentially of a thermally degraded phosphorylated starch having between 0.3 and 3 percent by weight of phosphorous molecularly bound therein and having a light color, a solubility higher than 30 percent in water at 25° C. and a viscosity in the range of about 5 to 500 cps when in 5 percent solution in water at 25° C.

2. A composition according to claim 1, said composition containing 60 to 80 parts of said dextrin phosphate to 20 to 40 parts of said nitrogen containing starch phosphate.

3. A composition for sizing synthetic textile fibers and yarns of mixed synthetic and cellulose fibers, comprising by dry weight a major proportion of a low molecular, highly water soluble dextrin phosphate and a minor proportion of a polymer selected from the group consisting of water soluble polyvinyl acetates, polyvinyl alcohols and polyacrylates, or of a mixture of such polymer and a high molecular nitrogen containing starch phosphate having a viscosity of about 40,000 to 60,000 cps when in 5 percent solution in water at 25° C., said dextrin phosphate consisting essentially of a thermally degraded phosphorylated starch having between 0.3 and 3 percent by weight of phosphorous molecularly bound therein and having a light color, a solubility higher than 30 percent in water at 25° C. and a viscosity in the range of about 5 to 500 cps when in 5 percent solution in water at 25° C.

4. A composition according to claim 3, containing between 5 and 30 percent of said polymer by dry weight.

5. A composition according to claim 3, the dry substance of which consists essentially of said dextrin phosphate and between 5 and 30 percent of a water soluble polyacrylate.

6. A composition according to claim 3, the dry substance of which consists essentially of about 50 to 70 percent of said dextrin phosphate in admixture with a water soluble polyacrylate and a high molecular nitrogen containing starch phosphate.

7. A composition according to claim 3, the dry substance of which consists essentially of about 50 to 70 percent of said dextrin phosphate in admixture with a water soluble polyvinyl alcohol and a high molecular nitrogen containing starch phosphate.

* * * * *